United States Patent
Wang et al.

(10) Patent No.: US 12,219,020 B2
(45) Date of Patent: Feb. 4, 2025

(54) SYSTEMS AND METHODS FOR PROCESSING HEARTBEAT PACKETS IN SWITCHING HARDWARE

(71) Applicant: Arista Networks, Inc., Santa Clara, CA (US)

(72) Inventors: Michael Chih-Yen Wang, Vancouver (CA); Victor Shih-Hua Wen, San Jose, CA (US); Navdeep Bhatia, Sunnyvale, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/863,129

(22) Filed: Jul. 12, 2022

(65) Prior Publication Data

US 2024/0022638 A1    Jan. 18, 2024

(51) Int. Cl.
*H04L 67/145* (2022.01)
*H04L 67/62* (2022.01)

(52) U.S. Cl.
CPC ............ *H04L 67/145* (2013.01); *H04L 67/62* (2022.05)

(58) Field of Classification Search
CPC .............................. H04L 67/145; H04L 67/62
See application file for complete search history.

(56) References Cited

U.S. PATENT DOCUMENTS

| | | | | |
|---|---|---|---|---|
| 8,599,858 B1 * | 12/2013 | Mizrahi | ................... | H04L 43/10 370/395.31 |
| 9,185,170 B1 * | 11/2015 | Grammel | ................ | H04L 43/06 |
| 10,075,534 B1 * | 9/2018 | Thomas | ................... | H04L 45/02 |
| 10,530,869 B2 | 1/2020 | Brown | | |
| 10,951,506 B1 * | 3/2021 | Seth | ........................ | H04L 43/10 |
| 11,121,956 B1 | 9/2021 | Sebastian | | |
| 2013/0343199 A1 * | 12/2013 | Wong | .................. | H04L 43/0823 370/242 |
| 2014/0108497 A1 * | 4/2014 | Yao | ..................... | H04N 21/2387 709/203 |
| 2015/0188814 A1 * | 7/2015 | Jain | ........................ | H04L 45/50 370/392 |
| 2015/0295909 A1 * | 10/2015 | Jethanandani | ...... | H04L 63/1441 726/3 |

(Continued)

OTHER PUBLICATIONS

Katz et al., "Bidirectional Forwarding Detection (BFD)," Jun. 2010, IETF RFC 5880, 49 pages. (Year: 2010).*

*Primary Examiner* — John A Follansbee
*Assistant Examiner* — Zonghua Du
(74) *Attorney, Agent, or Firm* — Sprinkle IP Law Group (57) ABSTRACT

Systems and methods for increasing the speed with which a network device can process "heartbeat" packets that are transmitted between the network device and its peers to verify that the communication links between them are active, or to detect when the communication links go down (i.e., are inactive). Received heartbeat packets are processed primarily by a switching application specific integrated circuit (ASIC) rather than a CPU of the network device. The switching ASIC identifies heartbeat sessions corresponding to received heartbeat packets and resets aging timers for these sessions if the timers have not already expired. The reduced processing and faster timing mechanism of the switching ASIC enables the network device to accommodate spikes in the received packet rate.

18 Claims, 5 Drawing Sheets

(56) References Cited

U.S. PATENT DOCUMENTS

| | | | |
|---|---|---|---|
| 2016/0378587 A1* | 12/2016 | Zhang | G06F 11/0772 |
| | | | 714/55 |
| 2017/0104828 A1* | 4/2017 | Brown | H04L 67/142 |
| 2019/0158394 A1* | 5/2019 | Chalapathy | H04L 41/0816 |
| 2019/0268256 A1* | 8/2019 | Mirsky | H04L 43/10 |
| 2021/0152463 A1* | 5/2021 | Zaki | H04L 45/22 |
| 2021/0160173 A1* | 5/2021 | Biradar | H04L 43/0841 |
| 2022/0094680 A1* | 3/2022 | Mirsky | H04L 43/10 |

\* cited by examiner

SYSTEMS AND METHODS FOR PROCESSING HEARTBEAT PACKETS IN SWITCHING HARDWARE

BACKGROUND

In network systems, packets of information are transmitted over communication links between the various nodes that form the network. In order for a network device at one node to successfully communicate a packet through the network, it must know which of the communication links are active and are therefore available to transmit the packets. Whether a communication link is active (available to transmit packets) or offline (not available to transmit packets) may be referred to herein as the health or the state of the communication link.

One way for the network device to maintain an awareness of the state of the communication links to its peers (the network devices at the other ends of the communication links) is to periodically transmit test packets simply for the purpose of testing the communication link to verify that it is active and available to transmit packets. Because these test packets are used to provide an indication of whether a communication link is active or "live," they are sometimes referred to as "heartbeat" packets.

Received heartbeat packets are conventionally handled by a central processing unit (CPU) of the network device. The CPU receives the heartbeat packets and performs a set of processing tasks (often referred to as a "full stack") in connection with the packets, which commonly includes timestamping on the receipt of each packets and using the timestamps to determine whether the "heartbeat" for a communication link has timed out (i.e., the heartbeat packets were not received within an expected timeframe), indicating that the link between the nodes has lost its connectivity.

The full-stack processing of the heartbeat packets in the CPU takes a substantial amount of time and processing resources, so the capacity of the CPU to handle large numbers of heartbeat packets (e.g., due to spikes in the rate at which the packets are received, or upscaling of the number of peers and corresponding links to the network device) can cause problems such as timing requirements of the heartbeat packets not being met, false indications of links being down, and network traffic being lost or delayed due to these false indications of downed links.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

In general, embodiments of the invention relate to network communications. More specifically, embodiments of the invention relate to systems and methods for increasing the speed with which a network device can process "heartbeat" packets that are transmitted between the network device and its peers to verify that the communication links between them are active, or to detect when the communication links go down (i.e., go offline). This enables the network device to maintain an awareness of which links can be used to transmit packets of information through the network.

Conventionally, the detection of heartbeat packets is performed by a network processor (CPU) in the network device. When a packet is received by the network device, the network processor performs a full stack of processing tasks with respect to the packet. If the received packet is determined to be a heartbeat packet, the CPU performs a full stack of tasks associated with the heartbeat packet, including keeping a timestamp for the connection associated with the heartbeat packet. The CPU also checks the timestamp to determine whether it has been recently updated. If the timestamp indicates that the heartbeat packet was received within a certain amount of time from the last heartbeat packet, the corresponding communication link is determined to be active. If no heartbeat packet is received within this time, the link times out and is assumed to be offline. As the number of network elements scales up (there may be tens of thousands), the CPU can become congested, the timestamping behavior of the CPU can become unreliable, and it is easy for packets to be lost and for links to falsely be deemed inactive.

Embodiments of the present invention do not process the received heartbeat packets in the CPU, but instead use the switching application specific integrated circuit (ASIC) of the network device. Because the primary purpose of the heartbeat packets is simply to confirm that associated communication links are active, the aging mechanism in the switching ASIC (which is currently used for media access control (MAC) aging) is used to determine whether received heartbeat packets are received within a defined timeframe. The aging mechanism available in a standard switching ASIC is orders of magnitude faster than the timestamping mechanism that is used by the CPU in the conventional processing of heartbeat packets. Embodiments disclosed herein the CPU timing mechanism and therefore process heartbeat packets much faster than conventional network devices and can detect when communication links go down more quickly than conventional network devices.

One embodiment of the invention is a method for performing heartbeat packet detection and processing in a network device to maintain awareness of the health of communication links to peer devices in a network. In this method, a session table contains entries corresponding to each of the communication links. Each of the entries is associated with an aging timer that indicates whether the corresponding communication link is active or inactive. The table is periodically scanned by a switching ASIC of the network device to identify entries for which the aging timer has expired (indicating that the corresponding communication links are inactive), and the switching ASIC notifies a CPU of the network device that these associated communication links are inactive. In addition to scanning the session table for expired entries, the switching ASIC receives and processes heartbeat packets which indicate that corresponding communication links are active. When a heartbeat packet is received, the switching ASIC identifies the communication link associated with the packet and identifies the session table entry associated with the same communication link. If the session entry indicates that the communication link is active (i.e., the aging timer for the entry has not yet expired), the switching ASIC resets the timer and discards the heartbeat packet. If the session entry indicates that the communication link is inactive (i.e., the aging timer for the entry has expired), the switching ASIC notifies the CPU that the commlink is inactive and discards the packet. Because the aging timer of the switching ASIC requires far fewer processing resources and is much faster than the timing mechanism of the CPU (which is conventionally used for this purpose), the network device is capable of processing received heartbeat packets at a much higher rate than conventional network devices and is less likely to experience delayed or lost heartbeat packets that result in false indications that corresponding communication links are inactive.

Another embodiment of the invention is a method for performing heartbeat packet detection and processing in a network device, where all packets received by the network device are initially examined by a switching ASIC of the network device rather than a CPU of the network device. When each packet is received, the switching ASIC examines the packet to determine whether it is a heartbeat packet or a non-heartbeat packet. If it is a non-heartbeat packet, the packet is handed off to the CPU, which performs a full stack of processing tasks on the packet, as would be performed in a conventional network device. If the received packet is a heartbeat packet, the switching ASIC identifies a communication link associated with the packet (e.g., by examining a unique identifier in the packet), and then looks up in a heartbeat session table an entry having the same identifier. If there is a corresponding entry in the session table, the communication link corresponding to the entry is considered to be active, so the switching ASIC resets the timer and discards the packet. If there is no corresponding entry in the session table, this indicates that the switching ASIC has determined that the aging timer for the entry has expired, so the switching ASIC discards the heartbeat packet. It should be noted that, in some alternative embodiments, the heartbeat packet may be provided to the CPU for statistics-keeping or other purposes rather than being discarded.

Independently of the processing of the heartbeat packets, the switching ASIC periodically scans the entries in the session table to identify entries for which the aging timer has expired. The communication links corresponding to the expired entries are considered to be inactive, so the switching ASIC notifies the CPU of the expired entries.

Because the processing of the heartbeat packets is performed entirely within the switching ASIC, the load on the CPU that would result from conventional processing of the heartbeat packets in the CPU is reduced. Additionally, because the expiration of the session entries is determined using the aging mechanism of the switching ASIC rather than the timing mechanism of the CPU, this process is more efficient than in conventional systems. These features reduce the delays and dropped packets which occur in conventional network devices and result in false indications of inactive communication links.

Another embodiment of the invention is a network device which is coupled to peer devices by corresponding communication links. The network device has a communication interface through which packets are received and transmitted, and has a switching ASIC and a CPU which handle the processing of the packets. The network device implements a heartbeat mechanism to maintain an awareness of the health status of each of the communication links. The heartbeat mechanism involves the periodic transmission of heartbeat packets over the communication links to verify that the communication links are active. The processing of received heartbeat packets is handled almost entirely by the switching ASIC (when the packets indicate that additional processing is required, the packets are handed off to the CPU for this processing). The switching ASIC receives all of the packets received from the peer devices and determines which ones are heartbeat packets. For each received heartbeat packet, the switching ASIC identifies the communication link with which the packet is associated and, if the communication link is active, resets an aging timer associated with the communication link. If the communication link is not active, the switching ASIC notifies the CPU so that any actions which need to be taken with respect to the communication link can be initiated or executed by the CPU. While the switching ASIC is the component primarily responsible for processing received heartbeat packets, the CPU is the component primarily responsible for processing transmitted heartbeat packets, which occurs with greater regularity than the processing of received heartbeat packets (i.e., there are fewer spikes in the packet rate). By shifting the processing of received heartbeat packets to the switching ASIC, the network device reduces the load on the CPU and takes advantage of the faster timing mechanism of the switching ASIC and the reduced amount of processing which occurs in the switching ASIC. This allows the network device of the present embodiment to process more received heartbeat packets at a faster rate than conventional network devices, causing less false indications of inactive communication links and less disruption of network traffic due to the false indications.

Figure 1:
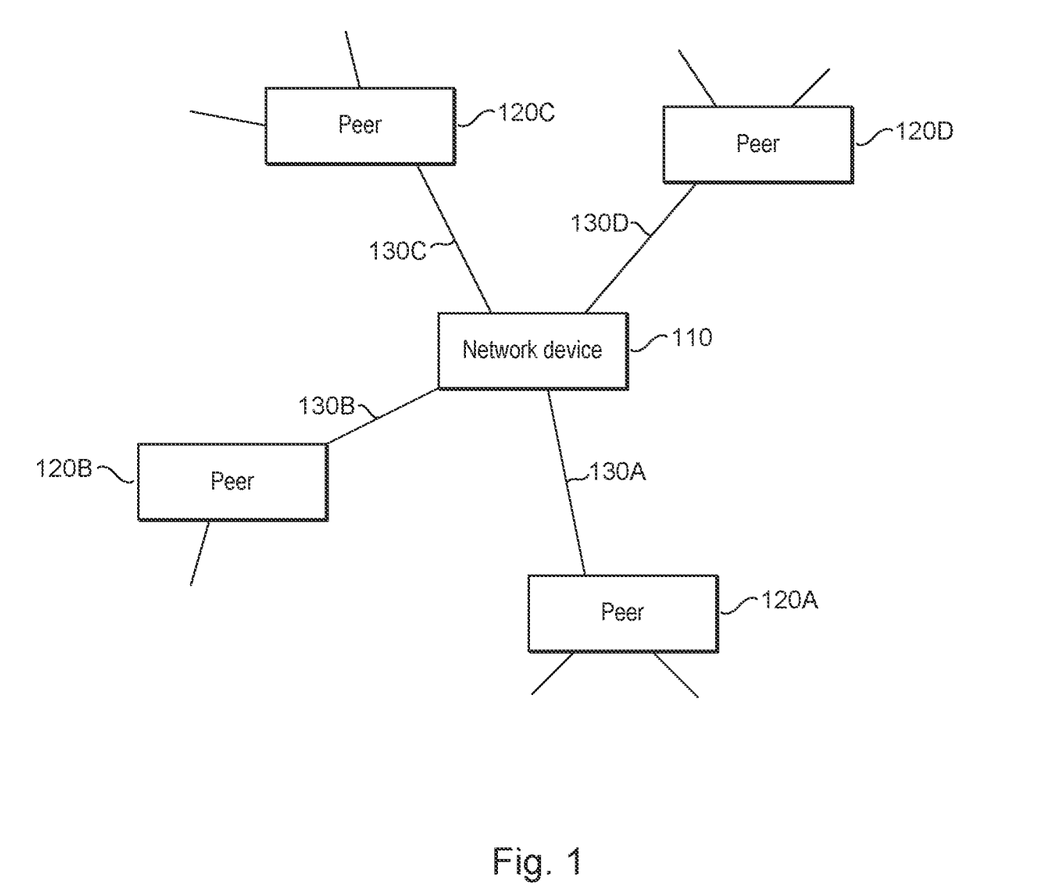
FIG. 1 is a diagram illustrating a portion of a network formed by a first network device and a set of additional, peer network devices in accordance with the prior art.

As noted above, data is transmitted through a network by sending packets of information from one node to another over communication links between the nodes. This is illustrated in FIG. 1, which shows a portion of a network 100 formed by network device 110 and a set of additional network devices 120 that are connected to network device 110. Embodiments of the invention will be described below with respect to a single network device (e.g., 110) will be referred to as a "network device", while the network devices (120) which serve as the surrounding network nodes will be referred to simply as "peers" or "peer devices."

It should be noted that instances of the same or similar elements in the figures are referenced by the same number, followed by a letter (e.g., peer 120A, peer 120B, . . . ) Such similar elements may be referred to collectively or generically by the reference number without the following letter (e.g., peers 120).

In the example of FIG. 1, network device 110 is coupled to each of peers 120 by a corresponding communication link 130. Communication links 130 may themselves include networks. Each of peers 120 may also be connected to one or more additional network nodes (not explicitly shown in the figure) by corresponding communication links 140. Network device 110 and peers 120 are each configured to exchange heartbeat packets to enable these devices to confirm that the communication links between them are active. In some embodiments, peers 120 may use the same heartbeat mechanisms as network device 110, although this is not necessarily the case.

In order to maintain an awareness of the health status of each of the communication links to the corresponding peer devices, network device 110 establishes heartbeat communication sessions with respect to each of the peers. Each heartbeat communication session serves as a means to maintain information corresponding to the communication link, allowing the network device to be aware of the health of the communication link. Some embodiments of the present invention may use the Bidirectional Forwarding Detection (BFD) protocol.

Once a heartbeat communication link is established between the network device and one of its peers, heartbeat packets will be transmitted back and forth between these devices to confirm the active state of the communication link. Each device will transmit heartbeat packets to the other device at regular, predetermined intervals, and will expect to receive heartbeat packets transmitted by the other device at these intervals. If the heartbeat packets are received within the expected time frame, the communication link between the devices will be considered active, but if the heartbeat packets are not received within this timeframe, the communication link will be considered to be inactive.

In some embodiments, the network device is configured to allow several heartbeat packets to be missed before the communication link is considered to be inactive. By doing so, the heartbeat mechanism can avoid false indications that the communication link is actually inactive, when it is actually the case that a heartbeat packet has simply experienced some unexpected delay. For example, if a heartbeat packet is transmitted every 50 milliseconds, the network device may be configured to consider the communication link active unless no heartbeat packets have been received for 150 milliseconds (i.e., at least two heartbeat packets have been missed).

It should be noted that the embodiments disclosed herein concern the processing of received heartbeat packets, rather than transmitted packets. It is anticipated that, while the present embodiments use the switching ASIC to implement new techniques for processing received heartbeat packets, the CPU of the network device may use conventional techniques to generate and transmit heartbeat packets to the peer devices.

Network device 110 may be, for example, a router, a switch, a server, or another device that supports network communications. This device may be configured to forward packets, determine whether communication links to peer devices are active or inactive, update packet forwarding in response to communication links going inactive, etc. Network device 110 may be configured to implement one or more network communication protocols.

Figure 2:
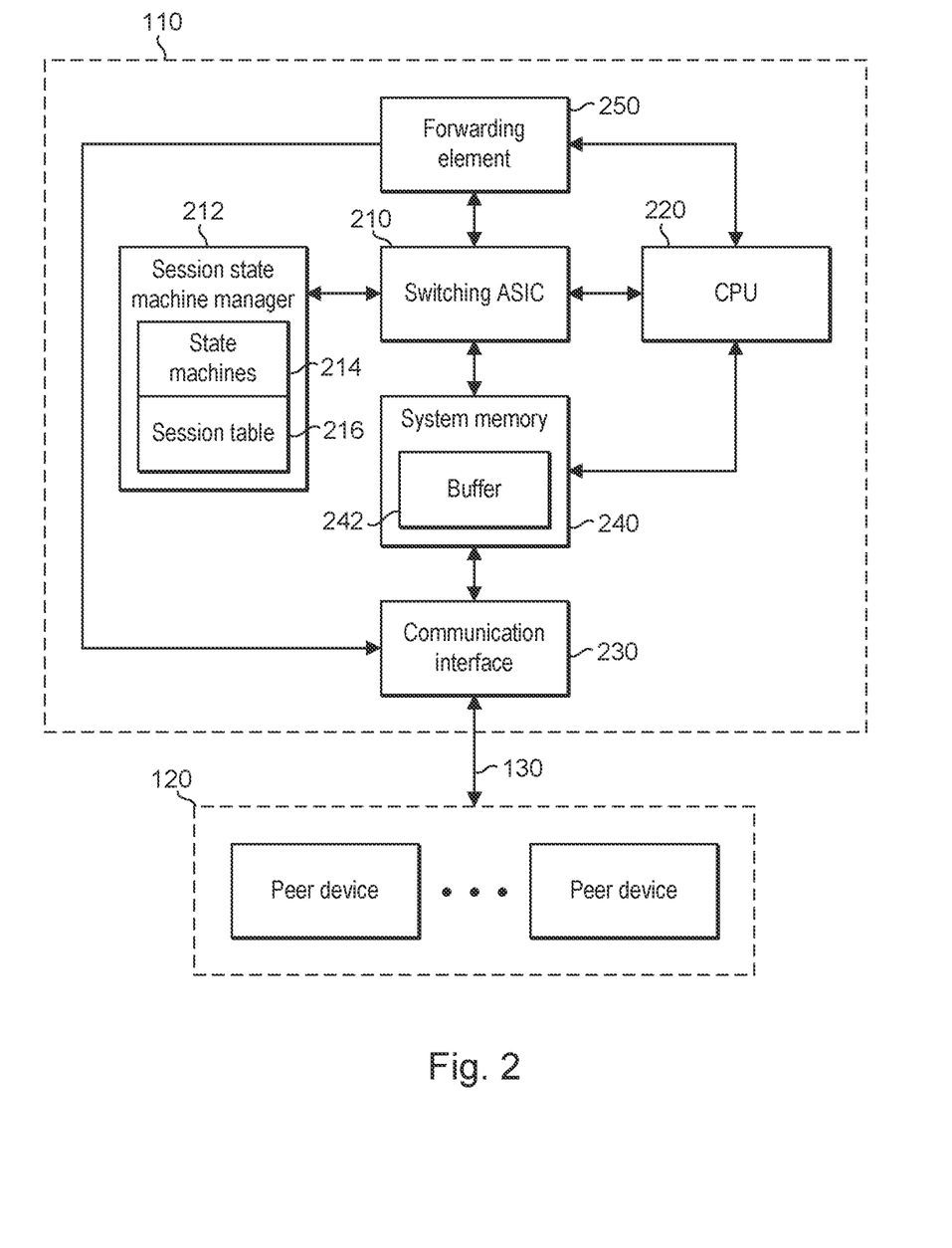
FIG. 2 is a block diagram illustrating the structure of a network device in accordance with one embodiment.

Referring to FIG. 2, the structure of a network device in accordance with one embodiment is shown. It should be noted that the structure of the network device in this embodiment is provided as an example, and alternative embodiments may have other structures which support the functionality described herein. Accordingly, embodiments of the invention should not be construed to be limited to the configuration of components illustrated in FIG. 2.

Network device 110 is coupled via communication links 130 to peer devices 120. It should be noted that, although only a single communication link is explicitly depicted in the figure, this link is representative of the multiple different links that are connected to the different peer devices.

Packets that are transmitted by peers 120 to network device 110 are received through a port of a communication interface 230 of the network device. In one embodiment, communication interface 230 is a hardware component that provides the functionality necessary to interface network device 110 with peers 120, including the receipt and transmission of heartbeat packets and data packets. Communication interface 230 may communicate via any suitable form of wired interface (e.g., Ethernet, fiber optic, serial communication, etc.) and/or wireless interface, and may utilize one or more protocols for the transmission and receipt of data (e.g., Transmission Control Protocol (TCP)/Internet Protocol (IP), Remote Direct Memory Access (RDMA), Institute of Electrical and Electronics Engineers (IEEE) 801.11, etc.) Communication interface 230 may include, for example, an interface processor, an interface cache, and a communication port.

Packets received by communication interface 230 are stored in a system memory 240 of the network device. In this embodiment, the system memory (or "memory" generally) is one or more hardware devices capable of storing digital information (e.g., data) in a non-transitory medium. As used herein, "system memory", "memory", "memory device", "memory storage", and "memory storage device" refer to hardware storage devices, regardless of whether that device is volatile, non-volatile, persistent, non-persistent, sequential access, random access, solid-state, or disk based.

When accessing system memory 240, other components of network device 110 are capable of reading and writing data. System memory 240 may use a unique physical address for each byte stored thereon, enabling software to access and manipulate data stored in the system memory by directing commands to a physical address of the system memory that is associated with a particular byte of data (e.g., via a virtual-to-physical address mapping). Software is therefore able to perform direct, byte-level manipulation of data stored in system memory.

Non-limiting examples of memory devices include, but are not limited to, certain integrated circuit storage (e.g., flash memory, random access memory (RAM), dynamic RAM (DRAM), static RAM (SRAM), resistive RAM (ReRAM), etc.). Further, hybrid memory devices may include two or more forms of storage (e.g., a non-volatile dual in-line memory module (NVDIMM)). For example, a persistent memory module that includes a combination of DRAM, flash memory, and a capacitor (for persisting DRAM data to flash memory in the event of power loss) is considered "memory".

In one or more embodiments, a system buffer (e.g., system buffer(s) 242 is a region of system memory 240 that temporarily stores data before a copy of that data is persisted on another storage device, and the data stored in system buffer is overwritten. System buffer(s) 242 may be used, for example, to store one or more outgoing heartbeat packets before being sent to a communication interface to be transmitted.

In some embodiments, the outer boundaries of a system buffer (i.e., the associated virtual and/or physical addresses of the system memory region) do not constrain the ability to write new data to that system buffer. In some embodiments, if the physical "end" of a system buffer is reached, new data is written to the "beginning" of that system buffer as if the system buffer continues in a loop, without physical interruption or size limitation. Such a system buffer may be considered "circular" because the newest data written to a system buffer is copied adjacent to the previous data (or to the beginning of the range), regardless of the physical limitations of the associated range and the data that may already exist in those locations.

In the embodiment of FIG. 2, network device 110 includes a switching ASIC 210 which has the primary responsibility for processing received heartbeat packets, and a CPU 220 which has the primary responsibility for processing transmitted heartbeat packets. More specifically, "transmitted heartbeat packets" refers to heartbeat packets that are generated by the network device and that are to be transmitted to the one or more peers of the network device via the corresponding communication links.

CPU 220 also has responsibility for processing received non-heartbeat data packets. "Data packets" or "non-heartbeat packets", as used herein, are packets other than heartbeat packets that contain data which is transmitted between network nodes in order to convey the data from a source to a destination for consumption by the destination. By contrast, heartbeat packets are intended simply to enable the network device(s) to maintain awareness of the health of the communication links between nodes in the network. Put another way, the heartbeat packets are transmitted for the purpose of testing the communication links, rather than for transporting data to a destination device for consumption by that device. The processing of transmitted heartbeat packets and non-heartbeat packets by CPU 220 may include providing the packets to forwarding element 250 for transmission through communication interface 230 to the appropriate communication links and peer devices.

In this embodiment, switching ASIC 210 receives all incoming packets that are received from peers 120. Switching ASIC 210 examines each incoming packet to determine whether or not the packet is a heartbeat packet. If the packet is not a heartbeat packet, it is offloaded (handed off) to CPU 220 for processing. In alternative embodiments, the switching ASIC can be configured to bridge or route non-packets toward their destinations without offloading them to the CPU. It should be noted that switching ASIC 210 may also hand off some received heartbeat packets to CPU 220 for processing when there are indications that these packets contain configuration or control information that requires conventional processing (e.g., if the packets are intended to configure the settings for the heartbeat mechanism).

If the received packet is a heartbeat packet, the packet is normally processed by switching ASIC 210 to determine whether or not it was received in the timeframe indicating that the corresponding link is still active. If the heartbeat packet is received within the predetermined timeframe, the aging mechanism of switching ASIC 210 is reset for the communication link and the heartbeat packet is discarded. In some embodiments, the heartbeat packet is provided to the CPU for statistical purposes, so "discarded" should be construed to mean that the switching ASIC has completed any heartbeat-related operations, so the packet has effectively been discarded by the switching ASIC. If the heartbeat packet is not received within the predetermined time frame, switching ASIC 210 updates session table 216 accordingly, and notifies CPU 220. Alternatively, switching ASIC 210 may notify CPU 220, and the CPU may then update session table 216 as needed.

Because the handling of a typical received heartbeat packet by switching ASIC 210 does not require full stack processing of the heartbeat packets, this saves the processing resources that are conventionally required to process the full stack of conventional packet processing tasks and also saves the time that is conventionally required for this processing. Network device 110 can therefore process heartbeat packets more quickly than a conventional network device, avoiding delays, dropped packets and other problems that may result in false indications that one or more of the communication links 130 to peer devices 120 are inactive.

In some embodiments, switching ASIC 210 uses a pipeline architecture such as the Intel® Tofino™ Ethernet switch ASIC (Intel® and Tofino™ belong to the registered owners of the marks and no claim is made herein to ownership of these marks). This is a match-action pipeline architecture in which subsets of data bits in the packet are matched against tables, where the matched entries in the tables specify corresponding actions that are applied to the packet.

In this embodiment, the switching ASIC implements a low-overhead timing mechanism which is referred to herein as an aging timer, or simply as a timer. When a heartbeat session is established, the timer is set to count down from a predetermined value to zero. Alternatively, the timer may count upwards from zero to the predetermined value. When a heartbeat packet is received, the session timer is reset to the predetermined value. Effectively, as the sessions or packets flow through the pipeline, the timer counts down. If a heartbeat packet for a session is received before the timer for the session counts down to 0, the timer is reset so that the count down process restarts from the predetermined value. If the timer reaches 0 before a heartbeat packet is received, the session is deemed to be inactive and the switching ASIC provides a corresponding notification to the CPU.

In one embodiment, the switching ASIC uses essentially the same mechanism that is used for media access control (mac) aging. This aging mechanism uses counter values in the entries of the heartbeat session table to determine whether the corresponding entries have expired. Each time a heartbeat packet is received, the switching ASIC resets the counter value of the entry associated with the received packet. The switching ASIC is also configured to perform a refresh cycle at set intervals, where at each refresh cycle, the ASIC goes through each entry in the heartbeat session table and decrements the counter value corresponding to the entry. If the counter value for an entry is decremented to (or past) zero, the entry has expired and the corresponding communication link is considered to be inactive, which triggers corresponding actions such as sending a notification of he to the CPU.

For example, in one embodiment, the heartbeat timing mechanism is configured to use a one-bit counter value. When a heartbeat packet corresponding to a particular entry in the session table is received, the counter value for the entry is set to 1. When a refresh cycle occurs, this counter is decremented to 0. In this embodiment, the entry is still considered to be active. If another heartbeat packet corresponding to the entry is received before the next refresh cycle, the counter value is reset to 1, and the process repeats.

If, on the other hand, no heartbeat packet for the entry is received before the next refresh cycle, the counter value remains at 0 and, when the refresh cycle occurs, the counter cannot be decremented from 0, so the entry is considered to be inactive. The switching ASIC therefore provides a notification to the CPU that the entry (and the corresponding communication link) is inactive.

The refresh cycle is configurable to any desired interval. If the refresh cycle in this example is set to 100 milliseconds, an entry which is active and which is reset upon receiving a corresponding heartbeat packet will be decremented within the 100 milliseconds after it is reset (the packet may be received at any time within the 100 millisecond interval). The counter value will therefore be at 0 following the refresh cycle. If another heartbeat packet for the entry is received within the next 100 milliseconds, the counter will be reset to 1 and the entry will still be considered active. If no heartbeat packet for the entry is received within the 100 milliseconds after the counter is decremented to 0, the entry will be considered inactive and the CPU will be notified.

Because the switching ASIC is inline and uses the packet driven mac aging mechanism that is designed into the ASIC, the switching ASIC can handle the line rate of packet traffic. The CPU, on the other hand, performs protocol level processing of packets, one at a time, and cannot parallelize the processing like the switching ASIC. Consequently, the CPU cannot handle processing of the packets at the line rate and would be overwhelmed (the queues of the CPU would be overloaded) if packets had to be processed at this rate. The CPU would therefore experience delays and dropped packets that would result in false negative indications of inactive communication links, which in turn cause delays in the forwarding of packets. Since the switching ASIC can process packets at the line rate, it has fixed timing behavior and can effectively provide a guaranteed service level, avoiding the false negatives of the CPU.

ASIC 210 uses a session state machine manager 212 to maintain awareness of the health of the communication links. Session state machine manager 212 manages a session table 216 which contains information related to the heartbeat sessions for the communication links. Session state machine manager 212 also manages state machines 214 for each of the heartbeat sessions.

Session state machine manager 212 may be a program stored on a non-transitory storage of the network device and executing on the network device. Session state machine manager 212 may manage communications between one or more session state machines 214 and ASIC 210 (for handling received heartbeat packets) and CPU 220 (for handling transmission of heartbeat packets). Session table 216 may be maintained in a memory which is dedicated for this purpose, or it may be maintained in system 240.

In some embodiments, heartbeat sessions for the different communication links are initiated and/or established by CPU 220 in response to corresponding requests, but this function may be performed by switching ASIC 210 in other embodiments.

Most of the heartbeat packets that are received by network device 110 are processed entirely by switching ASIC 210. The heartbeat packets can be received, used to identify and reset the aging mechanism for the associated communication link, and then dropped without ever having been touched by CPU 220. In some instances, apart from being examined and used to reset the aging mechanism for the communication link, a heartbeat packet may require additional processing. For example, the heartbeat packet may include information that is intended to configure the heartbeat mechanism (e.g., set the time interval after which a communication link is deemed to be inactive). The heartbeat mechanism may be configured while the communication sessions are active, or when they are inactive. In this case, switching ASIC 210 will hand off the packet to CPU 220 to perform the necessary processing.

CPU 220 is a physical device configured to send and/or receive packets to and/or from a network. CPU 220 may be, for example, a discrete processor, a digital signal processor, a microcontroller, or any other type of circuitry configured to send, receive and process packets. CPU 220 may include one or more registers, buffers or other memories for storing packets. As noted above, CPU 220 is responsible for handling the transmission of heartbeat packets to peer devices 120, and has responsibility for processing received heartbeat packets that are handed off from switching ASIC 210 for processing as indicated by flags or other indicators in the received heartbeat packets.

Figure 3:
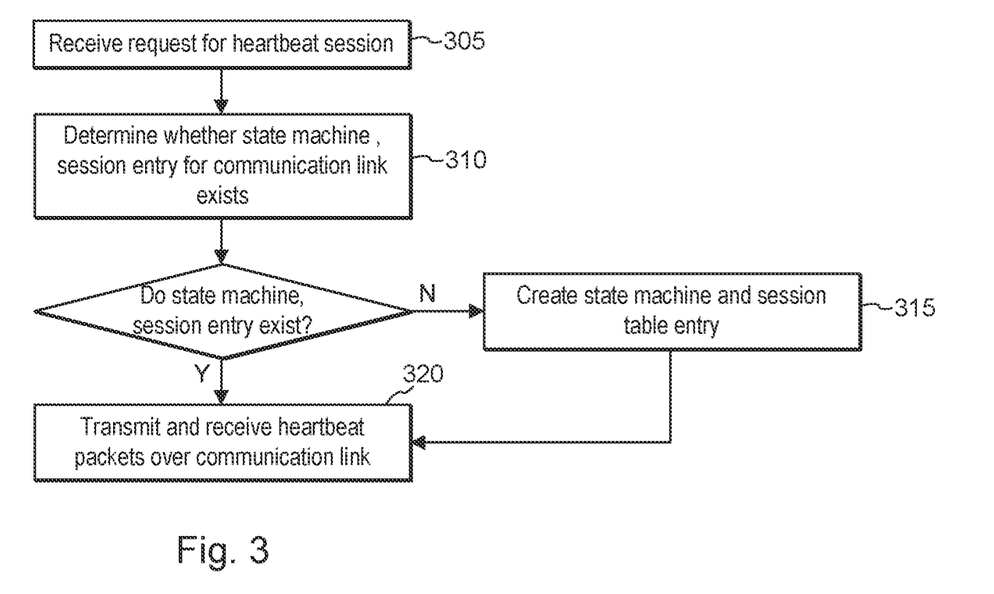
FIG. 3 is a flow diagram illustrating a method for establishing a heartbeat session in accordance with one embodiment.

Referring to FIG. 3, a flow diagram illustrating a method for establishing a heartbeat session in accordance with one embodiment is shown. This method may be used to instantiate a state machine for a heartbeat session associated with a particular communication link and to make a corresponding entry in the session table to track the active/inactive state of the communication link. This method is exemplary, and other methods may be used to establish a heartbeat session for communication links in other embodiments.

At step 305, a request for a heartbeat session is received. This request may, for example, be received from an application that wishes to communicate with a peer device. The operating system of CPU 220 of the network device may interpret the request for communication with the peer device as a request to initiate a heartbeat session with the peer device and associated communication link. The request may alternatively be received from an agent which is maintained by the network device and associated with a peer of the network device which is associated with the communication link.

Add step 310, the operating system executing on CPU 220 determines whether a session state machine 214 associated with the peer and corresponding communication link already exists. This may be accomplished by querying session state machine manager 212. If a session state machine corresponding to the peer already exists, the method proceeds to step 320. If there is no pre-existing session state machine for the peer, a new session state machine is created by session state machine manager 212 at step 315.

In some embodiments, when session state machine manager 212 creates a new session state machine for the peer device, the session state machine manager may create a transmit module which is specifically associated with the peer device and corresponding communication link. The transmit module is also configured as desired, including, for example, setting the interval at which successive heartbeat packets will be transmitted to the peer device. Rather than creating a receive module for the pier and corresponding communication link, the session state machine manager may create a corresponding entry in a session table that can be accessed by switching ASIC 210. The aging mechanism of switching ASIC 210 uses this entry to effectively track the time that has elapsed since the last heartbeat packet was received by the network device. The aging mechanism is reset for the entry when the entry is first created and no heartbeat packets have yet been received over the corresponding communication link.

At step 320, the transmit module corresponding to the communication link begins generating heartbeat packets and transmitting the packets to the peer device over the communication link. At the same time, the aging mechanism of the switching ASIC is active, so the timing mechanism for the entry in the heartbeat session table is effectively counting down as the network device waits for a received heartbeat packet corresponding to the peer and communication link.

Figure 4:
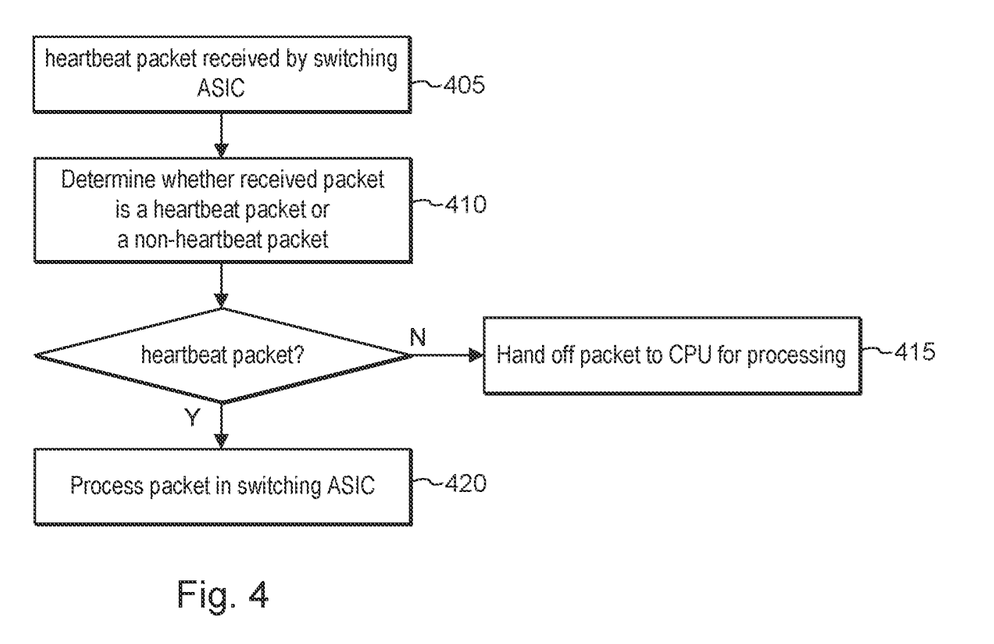
FIG. 4 is a flow diagram illustrating a method for receiving heartbeat packets in accordance with one embodiment.

Referring to FIG. 4, a flow diagram illustrating a method for receiving heartbeat packets in accordance with one embodiment is shown. In this embodiment, all packets received by the network device are initially processed by switching ASIC 210. At step 405, a packet is received by the switching ASIC. At step 410, the switching ASIC determines whether the packet is a heartbeat packet or a data packet of some other type. If the packet is determined to be a type other than a heartbeat packet, the packet is handed off to CPU 220 for processing (step 415). The CPU will perform the conventional, full stack of processing tasks on the packet and will provide the packet to a forwarding element of the network device as needed based on the processing of the packet. If, on the other hand, switching ASIC 210 determines that the received packet is a heartbeat packet, the switching ASIC itself proceeds with the processing of the packet (step 420).

Figure 5:
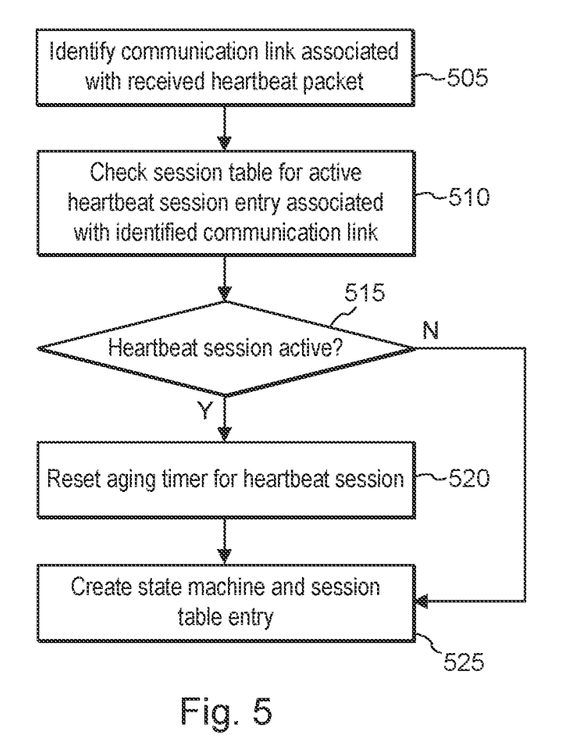
FIG. 5 is a flow diagram illustrating a method for processing a heartbeat packet in a switching ASIC in accordance with one embodiment.

Referring to FIG. 5, a flow diagram illustrating a method for processing the heartbeat packet in the switching ASIC in accordance with one embodiment is shown. At step 505, the switching ASIC examines the received heartbeat packet to identify the communication link with which the packet is associated. The associated communication link is identified using an identifier field in the heartbeat packet. For instance, in a network device that uses BFD, the heartbeat packets include MyDiscriminator and YourDiscriminator fields that contains identifiers of the communication link.

At step 510, the switching ASIC checks the session table to determine whether there is an entry that matches the identifier used in the received heartbeat packet. In the case of a network device using the BFD heartbeat mechanism, the switching ASIC looks up the value from the YourDiscriminator field in the heartbeat packet. If there is no matching entry in the session table, there is no active heartbeat session associated with the received heartbeat packet. The switching ASIC may be configured to take various actions in response to determining that the heartbeat packet is not associated with an active session, such as simply dropping (discarding) the packet, or notifying the CPU (e.g., for purposes of maintaining statistics regarding these packets. In the event that the CPU is notified, the CPU may in turn provide a notification to another entity (e.g., notifying an application that is associated with the use of the heartbeat mechanism), initiate establishment of a new heartbeat session associated with a communication link or peer device, or take some other action.

At step 515, if an entry corresponding to the heartbeat packet is found in the session table, the switching ASIC determines from the session entry or a corresponding state machine whether the heartbeat session is active. If the session is active, the switching ASIC resets the timing for the session (step 520) and discards the packet (step 525), unless there are one or more indicators associated with the received heartbeat packet which indicate that the packet should be handed off to the CPU for further processing. Examples of these indicators may include the message flags (e.g., Poll, Final, Control Plane Independent, Authentication Present, Demand and Multipoint flags) in a BFD-based system.

If, at step 515, the session table entry corresponding to the received heartbeat packet indicates that the session is inactive, the switching ASIC may be configured to drop the packet or notify the CPU that the session is inactive. If the switching ASIC notifies the CPU, the CPU may in turn notify an application that is associated with the use of the heartbeat mechanism, initiate a new heartbeat session for the communication link or take some other action.

In addition to identifying the heartbeat sessions associated with received heartbeat packets and resetting the entries with respect to the ASIC's aging/timing mechanism, the switching ASIC is configured to identify ones of the heartbeat session entries which are indicated by the aging mechanism to have expired.

Figure 6:
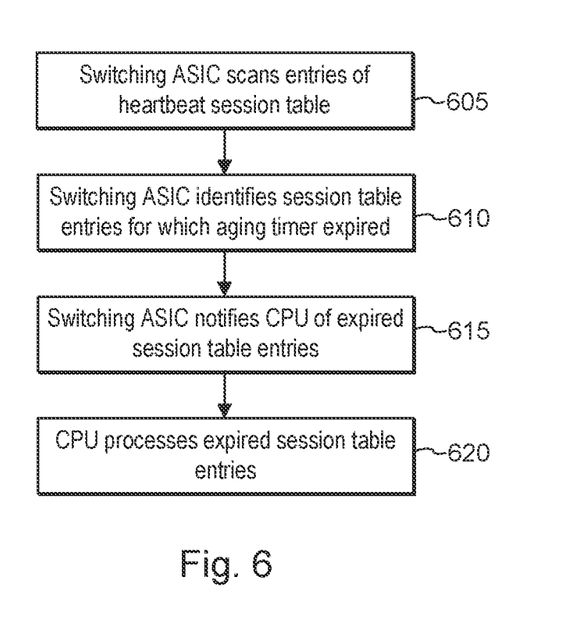
FIG. 6 is a flow diagram illustrating a method for identifying expired session table entries in accordance with one embodiment.

Referring to FIG. 6, a flow diagram illustrating a method for identifying expired session table entries in accordance with one embodiment is shown. This method runs concurrently with the processing of the received heartbeat packets. "Concurrently" should be construed broadly to include simultaneous processes executed in the switching ASIC, alternately executing the processes or portions of the processes, or any other techniques which allow the identification of expired session table entries without significantly delaying or interrupting the processing of received heartbeat packets.

At step 605, the switching ASIC scans entries in the heartbeat session table. The scanning of the entries is effectively continuous, so that each of the entries is periodically examined to determine whether or not it has expired. At step 610, the switching ASIC identifies one or more of the session table entries that have expired. In response to identifying more expired session table entries, the switching ASIC notifies the CPU of the expired entries (step 615). At step 620, the CPU processes the expired session table entries, which may include actions such as notifying related applications, re-establishing the corresponding communication links, or various other actions.

As noted above, in some embodiments the switching ASIC may be configured to hand off received heartbeat packets to the CPU if these packets contain indications that there is "non-timer" processing to be done with respect to the packets beyond simply identifying associated heartbeat sessions and resetting the timing on these sessions to indicate that they remain active. In embodiments that implement BFD heartbeat mechanisms, the heartbeat packets include flag fields (Poll, Final, Control Plane Independent, Authentication Present, Demand, Multipoint) in a BFD-based system.) that can be used to indicate that some additional action needs to be taken with respect to the packets. For example, when a handshake process is being performed in a network device that uses a BFD protocol, successive BFD heartbeat packets may set the Control Plane Independent, Poll and Final flags so that the switching ASIC traps to the CPU for processing of these packets. An exemplary method for handing off these heartbeat packets to the CPU is shown in FIG. 7.

Figure 7:
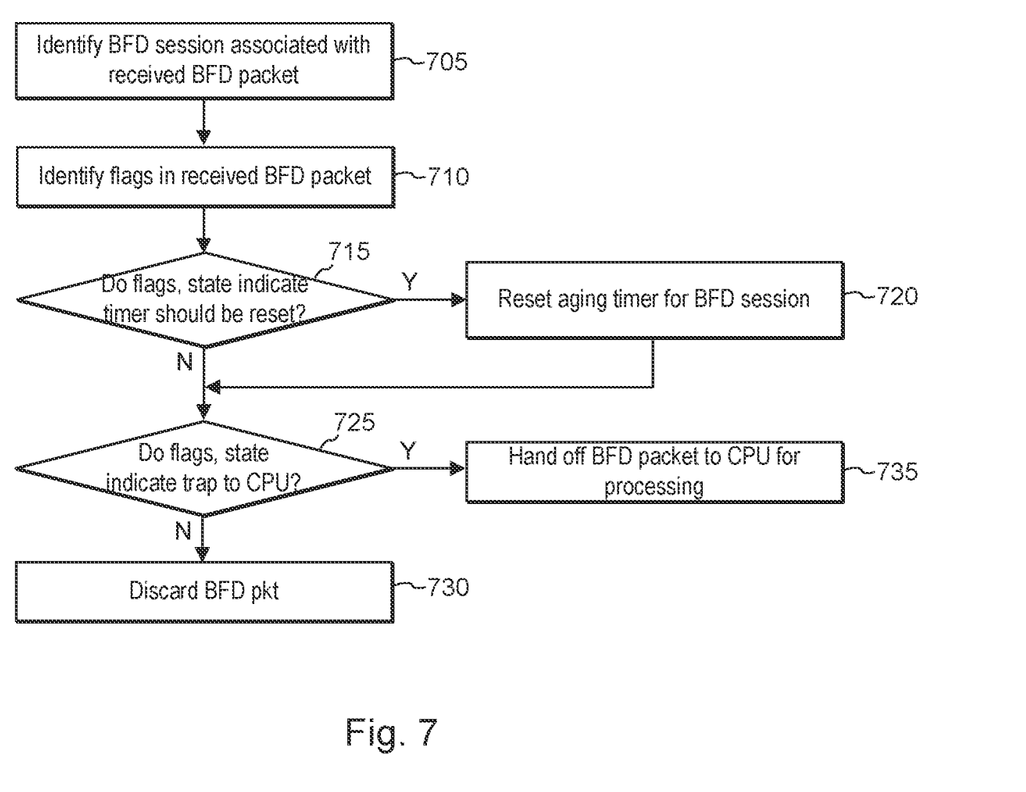
FIG. 7 is a flow diagram illustrating an exemplary method for handing off heartbeat packets from a switching ASIC to a CPU in accordance with one embodiment.

At step 705 of FIG. 7, the switching ASIC identifies a session associated with a received BFD heartbeat packet. At step 710, the switching ASIC identifies a state indicated in the packet, as well as any flags that are set in the packet. At step 715, the switching ASIC determines whether the state or any of the flags indicate that the timer for the session should be reset. For example, if the state is indicated to be active (up) or any of the Poll, Final or Control Plane Independent flags are set, the process moves to step 720 and the timer is reset. If the state indicator in the packet is anything other than active (up), or if any of the Authentication Present, Demand or Multipoint flags is set, the timer is not reset.

At step 725, the switching ASIC determines whether the state or flags of the received heartbeat packet indicates that the packet should be provided to the CPU for further processing. For instance, if the state indicator in the packet is anything other than active (up), or if any of the flags is set, the switching ASIC traps to the CPU and hands off the packet for processing by the CPU. If indicated by the corresponding flags or state value, the switching ASIC traps to the CPU and the received BFD packet is handed off to the CPU for processing (step 735). If there are no such indications, the packet is simply discarded (step 730) (although some embodiments may provide packets to the CPU for statistical purposes rather than discarding them).

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for performing heartbeat packet detection and processing in a network device, the method comprising:
    maintaining, by a switching application specific integrated circuit (ASIC) implementing a heartbeat mechanism in a network device, heartbeat session entries for a plurality of heartbeat sessions, the switching ASIC tracking aging of each of the heartbeat session entries, sweeping the heartbeat session entries to identify expired heartbeat session entries, and providing notification of the expired heartbeat session entries to a central processing unit (CPU) of the network device;
    receiving, by the switching ASIC, a first incoming packet;
    determining, by the switching ASIC, the first incoming packet is a heartbeat packet;
    processing, by the switching ASIC, the heartbeat packet by:
        checking one or more flags of the heartbeat packet;
        determining that one of a first subset of the one or more flags is set and resetting an aging timer for a corresponding one of the heartbeat session entries, and trapping to the CPU for further processing of the heartbeat packet; and
        determining that one of a second subset of the one or more flags is set and trapping to the CPU for further processing of the heartbeat packet without resetting the aging timer for the corresponding one of the heartbeat session entries;
    receiving, by the switching ASIC, a second incoming packet;
    determining, by the switching ASIC, the second incoming packet is not the heartbeat packet; and
    offloading, by the switching ASIC, processing of the second incoming packet to the CPU.

2. The method of claim 1, wherein each heartbeat session entry is established by the CPU.

3. The method of claim 2, wherein resetting the aging timer comprises identifying the heartbeat session entry using an identifier in the heartbeat packet.

4. The method of claim 3, wherein the heartbeat mechanism is a bidirectional forwarding detection (BFD) mechanism.

5. The method of claim 4, wherein the identifier is a MyDiscriminator or YourDiscriminator field in the heartbeat packet.

6. The method of claim 4, wherein the one or more flags are BFD message flags.

7. The method of claim 1, further comprising determining, by the switching ASIC, whether one of the heartbeat session entries corresponding to the heartbeat packet indicates that the corresponding heartbeat session is up or down.

8. The method of claim 7, further comprising, when the one of the heartbeat session entries corresponding to the heartbeat packet indicates that the corresponding heartbeat session is up, resetting the aging timer for the corresponding one of the heartbeat session entries and discarding the heartbeat packet.

9. The method of claim 7, further comprising when the one of the heartbeat session entries corresponding to the heartbeat packet indicates that the corresponding heartbeat session is down, discarding the heartbeat packet.

10. A network device, comprising:
    a memory;
    a CPU; and
    a switching ASIC, the switching ASIC adapted for:
        implementing a heartbeat mechanism including maintaining heartbeat session entries for a plurality of heartbeat sessions by: tracking aging of each of the heartbeat session entries, sweeping the heartbeat session entries to identify expired heartbeat session entries, and providing notification of the expired heartbeat session entries to the CPU;
        receiving a first incoming packet;
        determining the first incoming packet is a heartbeat packet;
        processing the heartbeat packet by:
            checking one or more flags of the heartbeat packet;
            determining that one of a first subset of the one or more flags is set and resetting an aging timer for a corresponding one of the heartbeat session entries, and trapping to the CPU for further processing of the heartbeat packet; and
            determining that one of a second subset of the one or more flags is set and trapping to the CPU for further processing of the heartbeat packet without resetting the aging timer for the corresponding one of the heartbeat session entries;
        receiving a second incoming packet;
        determining the second incoming packet is not a heartbeat packet; and
        offloading processing of the second incoming packet to the CPU.

11. The system of claim 10, wherein each heartbeat session entry is established by the CPU.

12. The system of claim 11, wherein resetting the aging timer comprises identifying the heartbeat session entry using an identifier in the heartbeat packet.

13. The system of claim 12, wherein the heartbeat mechanism is a bidirectional forwarding detection (BFD) mechanism.

14. The system of claim 13, wherein the identifier is a MyDiscriminator or YourDiscriminator field in the heartbeat packet.

15. The system of claim 13, wherein the one or more flags are BFD message flags.

16. The system of claim 10, wherein the switching ASIC is further adapted to determine whether one of the heartbeat session entries corresponding to the heartbeat packet indicates that the corresponding heartbeat session is up or down.

17. The system of claim 16, wherein the ASIC is further adapted for, when the one of the heartbeat session entries corresponding to the heartbeat packet indicates that the corresponding heartbeat session is up, resetting the aging timer for the corresponding one of the heartbeat session entries and discarding the heartbeat packet.

18. The system of claim 16, wherein the ASIC is further adapted for, when the one of the heartbeat session entries corresponding to the heartbeat packet indicates that the corresponding heartbeat session is down, discarding the heartbeat packet.

* * * * *